United States Patent

Shinke et al.

[11] Patent Number: 6,153,963
[45] Date of Patent: Nov. 28, 2000

[54] DRIVE DEVICE

[75] Inventors: Satoshi Shinke, Sakai; Yasuhiro Okamoto, Osakasayama; Ryuichi Yoshida, Sakai, all of Japan

[73] Assignee: Minolta Co., Ltd., Osaka, Japan

[21] Appl. No.: 09/189,077

[22] Filed: Nov. 9, 1998

[30] Foreign Application Priority Data

Nov. 10, 1997 [JP] Japan .................................. 9-307376

[51] Int. Cl.⁷ .................................................. H01L 41/06
[52] U.S. Cl. ...................................................... 310/323.02
[58] Field of Search ........................... 310/328, 323.02, 310/12

[56] References Cited

U.S. PATENT DOCUMENTS

| | | | |
|---|---|---|---|
| 3,246,608 | 4/1966 | Cooper | 310/328 X |
| 3,377,489 | 4/1968 | Brisbane | 310/328 |
| 3,808,488 | 4/1974 | Massa | 310/328 |
| 4,219,755 | 8/1980 | O'Neill et al. | 310/328 X |
| 4,736,131 | 4/1988 | Fujimoto | 310/328 |
| 4,777,398 | 10/1988 | Shibuya | 310/328 |
| 4,947,077 | 8/1990 | Murata | 310/328 |
| 5,225,941 | 7/1993 | Saito et al. | 359/824 |
| 5,589,723 | 12/1996 | Yoshida et al. | 310/328 |
| 5,631,517 | 5/1997 | Kato et al. | 310/322.02 |
| 5,786,654 | 7/1998 | Yoshida et al. | 310/328 |

FOREIGN PATENT DOCUMENTS 0601671  6/1994  European Pat. Off. ............... 310/323

*Primary Examiner*—Mark O. Budd
*Attorney, Agent, or Firm*—Sidley & Austin

[57] ABSTRACT

A drive unit 20, comprising a moving body 24 and a friction drive member 26 fixedly attached at each end of a piezo-electric element 22 in the layer direction, is disposed between a pair of fixed friction members 14 having a plurality of divided contact parts 15 divided by notches 14s formed at equal spacing along the movement path of the friction drive member 26. The divided contact parts 15 are arrayed so as to be slightly inserted into the movement path of the friction drive member 26, and become elastically deformed when in contact with the friction drive member 26 so as to exert a force on friction drive member 26 in reaction thereto. This exerted force remains uniform regardless of the relative position of the friction drive member 26.

22 Claims, 6 Drawing Sheets

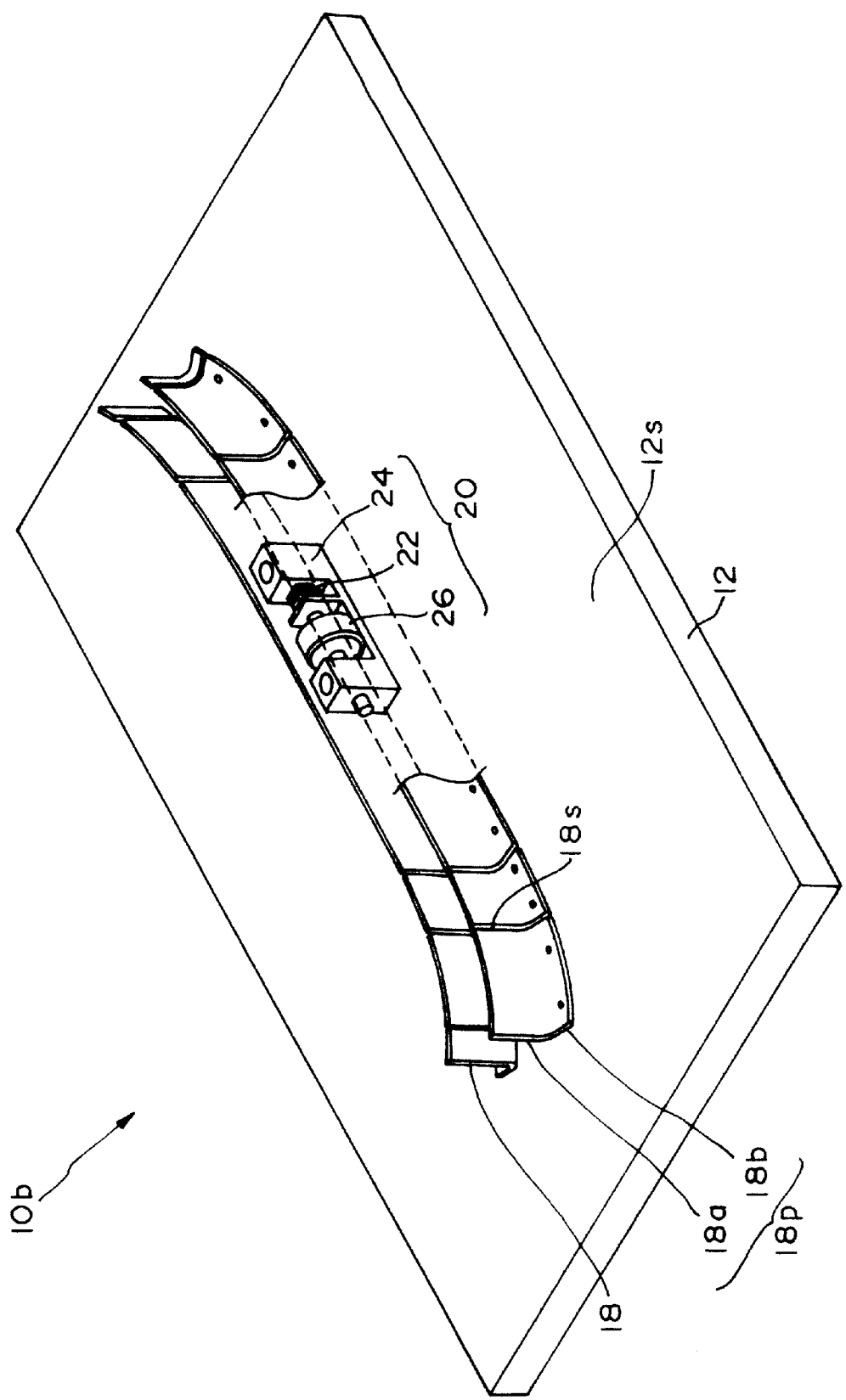

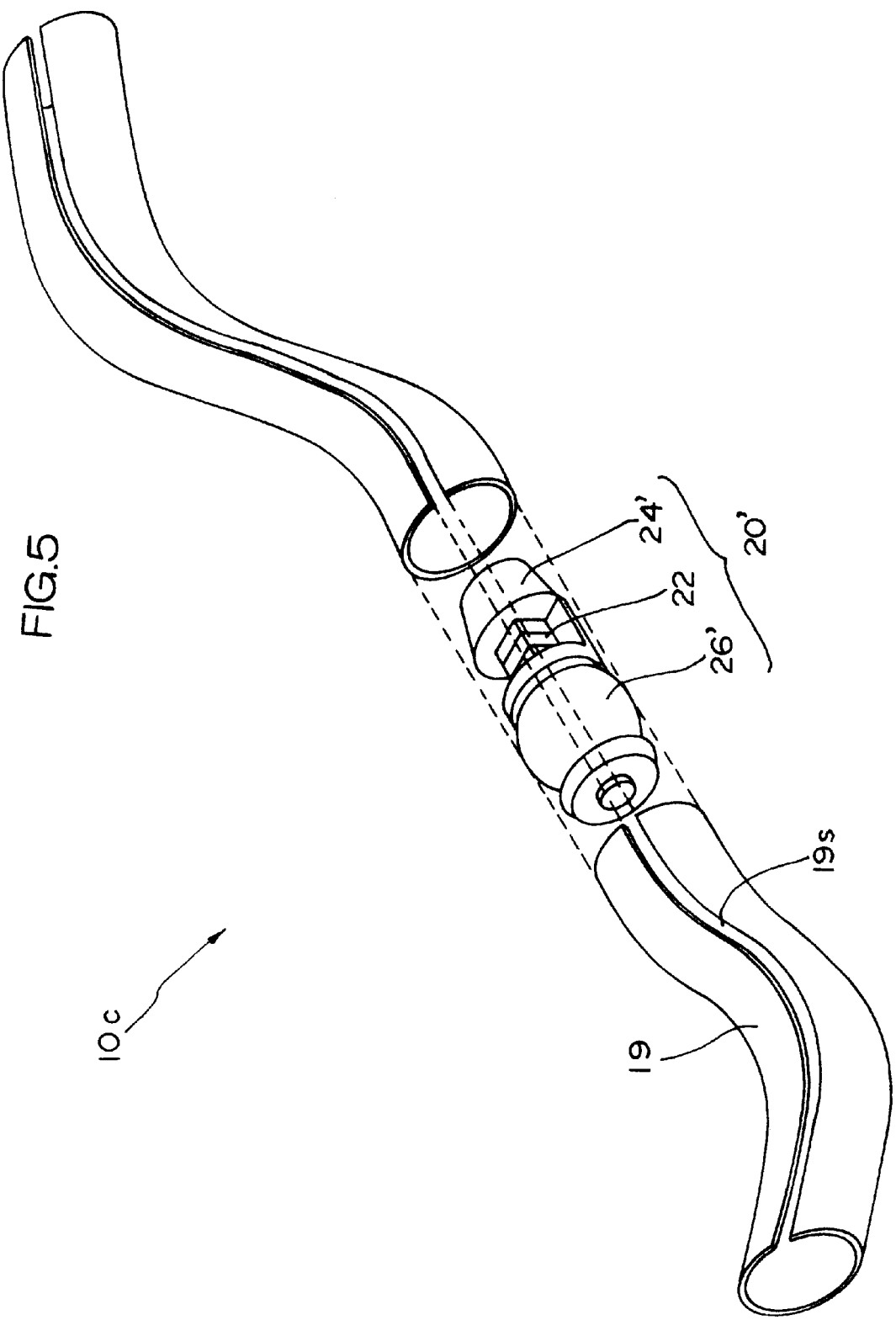

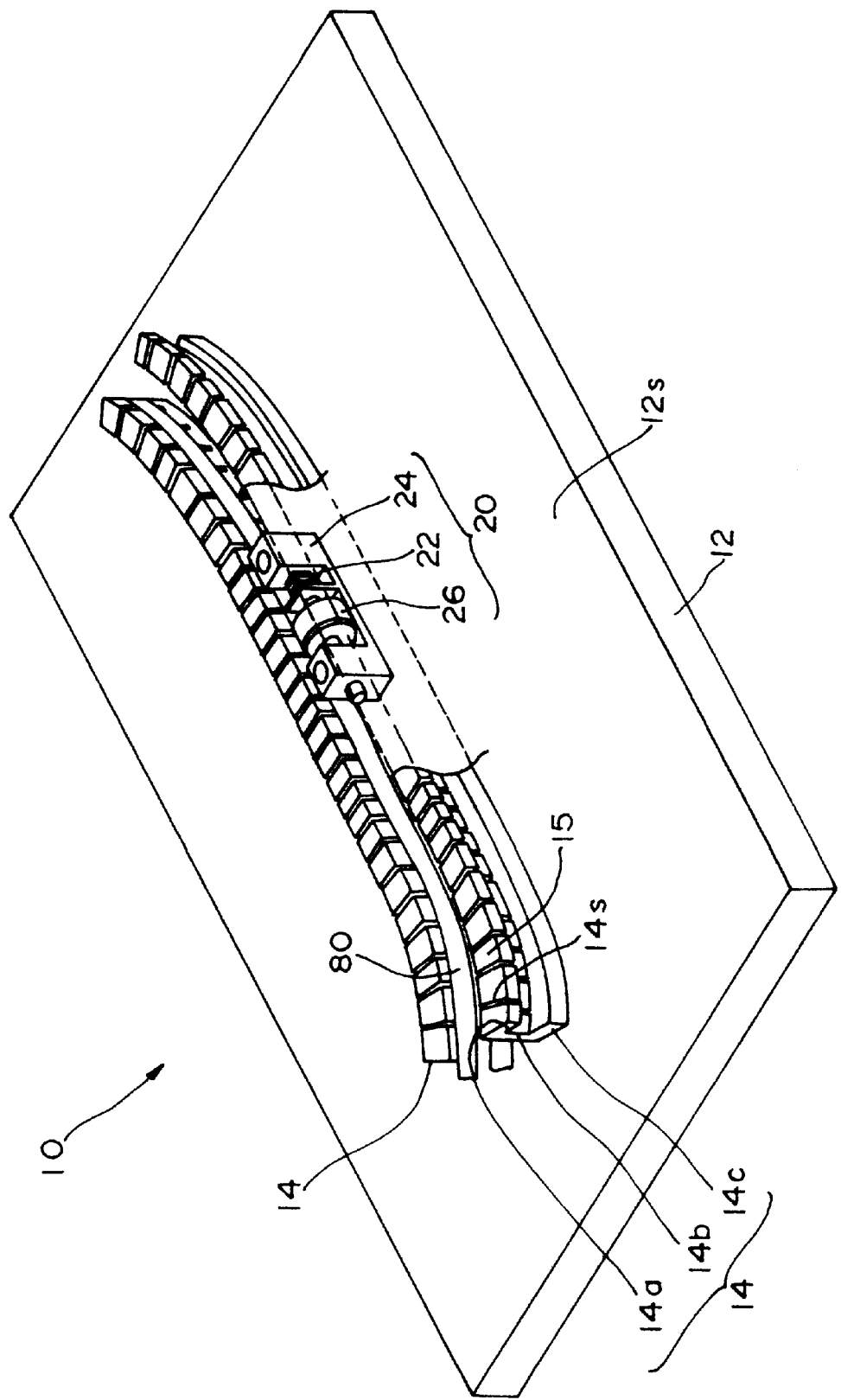

DRIVE DEVICE

This application is based on Application No. HEI 9-307376 filed in Japan, the content of which is hereby incorporated by reference.

BACKGROUND OF THE INVENTION

1. Field of the Invention

The present invention relates to a drive device, and specifically relates to a drive device using an electromechanical conversion element or transducer such as a piezoelectric element, for example, a drive device suitable for precision driving of a probe of a tunnel scanning type electron microscope, a camera photographic lens, or an XY drive table.

2. Description of the Related Art

Conventionally, a drive device using an electromechanical transducer has been proposed. The applicants have previously proposed a drive device capable of high resolution in the order of the submicron level using a piezoelectric linear actuator in place of a stepping motor.

An example of such drive device using an electromechanical transducer is shown in FIG. 1A. The drive device 1 of FIG. 1A provides a drive unit 20 friction bonded in space 9 between a pair of fixed friction members 4 and 6 fixedly attached to the top surface 2s of base 2. One fixed friction member 6 is supported on base 2 via a holding spring 8, which exerts a force toward the other fixed friction member 4.

Specifically, drive unit 20 comprises a moving body 24 having a relatively large mass connected to a driven member, for example, a lens, stage or the like not shown in the drawing, a piezoelectric element 22, and a friction drive member 26 having a relatively small mass. One endface of piezoelectric element 22 in the direction of expansion/contraction is fixedly attached to moving body 24, and the other endface is fixedly attached to one axial endface of friction drive member 26. Friction drive member 26 is supported on moving body 24 so as to be freely movable in the direction of expansion/contraction of piezoelectric element 22.

More specifically, piezoelectric element 22 is one type of electromechanical conversion element, comprising a plurality of layered piezoelectric panels which change volume when a voltage is applied, so as to expand and contract in the layer direction via changes in the applied voltage. Moving body 24 is largely columnar in shape, and has screw holes 24a and 24b for mounting driven members not shown in the drawing. The top surface of moving body 24 is notched downward so as to form two concavities 24s and 24t, which accommodate piezoelectric element 22 and friction drive member 26, respectively. Friction drive member 26 is provided with extending shafts 26t at bilateral ends of a cylindrical main body 26s, each shaft 26t being supported by moving body 24 so as to be freely movable in the axial direction, and one shaft 26t being fixedly connected to piezoelectric element 22. The main body 26s of friction drive member 26 has a larger width than does either piezoelectric element 22 or moving body 24, such that the exterior surface of main body 26s is in contact with the surfaces 4s and 6s of the pair of opposed fixed friction members 4 and 6, respectively.

Each electrode of piezoelectric element 22 is connected to a drive pulse generating circuit not shown in the drawing, which supplies to piezoelectric element 22 a pulse voltage of suitable waveform such as a sawtooth shape, full rectified wave and the like. For example, the speeds of the expansion and contraction of piezoelectric element 22 may differ so as to generate sliding of different magnitude in the reverse direction between friction drive member 26 and fixed friction members 4 and 6, or sliding may be generated in only one direction with either the expansion or contraction of piezoelectric element 22 with no sliding with the other action so as to move friction drive member 26 and in conjunction therewith the moving body 24 and driven members along the fixed friction members 4 and 6.

In drive device 1, when there is a relative change in position of the drive unit 20 relative to the fixed friction members 4 and 6, the magnitude of the pressing force received by friction drive member 26 from the fixed friction members 4 and 6 changes in conjunction with the change in inclination and elastic deformation of the fixed friction member 6, thereby changing the frictional force between the friction drive member 26 and fixed friction members 4 and 6 so as to change the drive conditions. As a result, the drive speed and drive force change in accordance with the relative positions of the friction drive member 26 and the fixed friction members 4 and 6.

SUMMARY OF THE INVENTION

An object of the present invention is to provide an improved drive device.

Another object of the present invention is to provide a drive device which exerts a uniform friction force between a friction drive member and fixed friction member, regardless of the relative positions of the friction drive member and fixed friction member.

One aspect of the present invention for attaining the aforesaid objects is a drive device comprising an expanding/contracting electromechanical conversion element or electromechanical transducer connected to a drive pulse generator, a moving body fixedly attached to one end of the electromechanical conversion element in the direction of expansion/contraction, a friction drive member fixedly attached to the other end of the electromechanical conversion element in the direction of expansion/contraction, and a fixed friction drive member friction bonded to the friction drive member so as to not move in the direction of travel of the moving body, wherein expansion/contraction displacement of the electromechanical conversion element is generated by the drive pulse generator to drive the friction drive member and move the moving body in a predetermined direction, the minor part of the fixed friction member in contact with the friction drive member and the part of the fixed friction member in proximity thereto is partially shunted by the friction drive member, and in reaction therewith the minor part and the proximity part exert a force of constant magnitude on the friction drive member.

Another aspect of the present invention is a drive device comprising an expanding/contracting electromechanical conversion element connected to a drive pulse generator, a moving body fixedly attached to one end of the electromechanical conversion element in the direction of expansion/contraction, a friction drive member fixedly attached to the other end of the electromechanical conversion element in the direction of expansion/contraction, and two fixed friction members stationary in place and holding the friction drive member by friction bonding to the friction drive member so as to not move in the direction of travel of the moving body along the movement path of the friction drive member, wherein expansion/contraction displacement of the electromechanical conversion element is generated by the drive pulse generator to drive the friction drive member and move the moving body in a predetermined direction, and wherein at least one of the fixed friction members has a plurality of divided contact parts arrayed along the movement path of the friction drive member so as to insert the friction drive member into the movement path. Furthermore, when the divided contact parts of the fixed friction member come into contact with the friction drive member and the friction drive member is retracted from the movement path, the divided contact parts are provided with a force-exerting member to exert a force on the friction drive member.

According to the aforesaid construction, the force-exerting member exerts a force on the divided contact parts toward the friction drive member. This exerted force can be constant for each divided contact part. The friction force between the friction drive member and the fixed friction members is proportional to the force exerted by the divided contact parts on the friction drive member.

Therefore, a uniform friction force is imparted between the friction drive member and the fixed friction members regardless of the relative positions of the friction drive member and the fixed friction members.

Another aspect of the aforesaid construction is the provision of a plurality of notches at suitable spacing in part of the fixed friction members along the movement path of the friction drive member, such that a plurality of divided contact parts divided by the notches enter somewhat into the movement path of the friction drive member and are arrayed along the movement path of the friction drive member. The divided contact parts elastically deform when making contact with the friction drive member so as to retract from within the movement path of the friction drive member and in response exert a force on the friction drive member.

According to this construction, the divided contact parts of the fixed friction member are elastically deformed to respectively function as force-exerting members. Each divided contact part is connected to a common support of the fixed friction member, and when the common support is fixed to a base, each divided contact part can be arranged at predetermined positions. In this way construction and assembly are simplified by providing fewer parts.

Still another aspect of the aforesaid construction is that the divided contact parts of the fixed friction member provide a plurality of divided fixed friction members arrayed along the movement path of the friction drive member and slightly enter the movement path of the friction drive member. The force-exerting member is a plurality of springs forcing the divided fixed friction members into the movement path of the friction drive member.

According to this construction, the divided fixed friction members are respectively forced by the springs, so as to readily allow adjustment of the force exerted on the friction drive member.

This construction readily allows for optimum spring constant of the springs and friction coefficient of the divided fixed friction members by providing the divided fixed friction members and springs as separate members. On the other hand, the number of parts can be reduced and assembly simplified by integrating the divided fixed friction members and springs in a single member.

Yet another aspect of the present invention is a drive device comprising an expanding/contracting electromechanical conversion element connected to a drive pulse generator, a moving body fixedly attached to one end of the electromechanical conversion element in the direction of expansion/contraction, a friction drive member fixedly attached to the other end of the electromechanical conversion element in the direction of expansion/contraction, a fixed friction members stationary in place and holding the friction drive member by friction bonding to the friction drive member so as to not move in the direction of travel of the moving body along the movement path of the friction drive member, wherein expansion/contraction displacement of the electromechanical conversion element is generated by the drive pulse generator to drive the friction drive member and move the moving body in a predetermined direction, and the fixed friction member is tube-like with a lengthwise slit having an interior diameter slightly smaller than the exterior diameter of the friction drive member, with the friction drive member arranged within this tube-like member. Furthermore, this tube-like member deforms upon contact with the friction drive member to partially expand the slit, and in reaction to tighten upon the friction drive member so as to friction bond to the friction drive member.

According to the aforesaid construction the thickness, material, and slit spacing of the tube-like member, for example, may be uniform, to easily provide a constant tightening force for tightening the tube-like member on the friction drive member regardless of the position of the friction drive member.

In this way a uniform friction force can be exerted between the friction drive member and fixed friction member regardless of the relative positions of the friction drive member and the fixed friction member.

Three-dimensional drive may be readily provided by curving the tube-like member.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

FIG. 4 is a perspective view of a drive device of a third embodiment of the present invention;

FIG. 5 is a perspective view of a drive device of a fourth embodiment of the present invention; and FIG. 6 is a perspective view of a drive device of a fifth embodiment of the present invention.

DETAILED DESCRIPTION OF THE PREFERRED EMBODIMENTS

The preferred embodiments of the present invention are described hereinafter with reference to FIGS. 2–6.

Device 10 of the first embodiment is described below with reference to the perspective view of FIG. 2.

Figure 1:
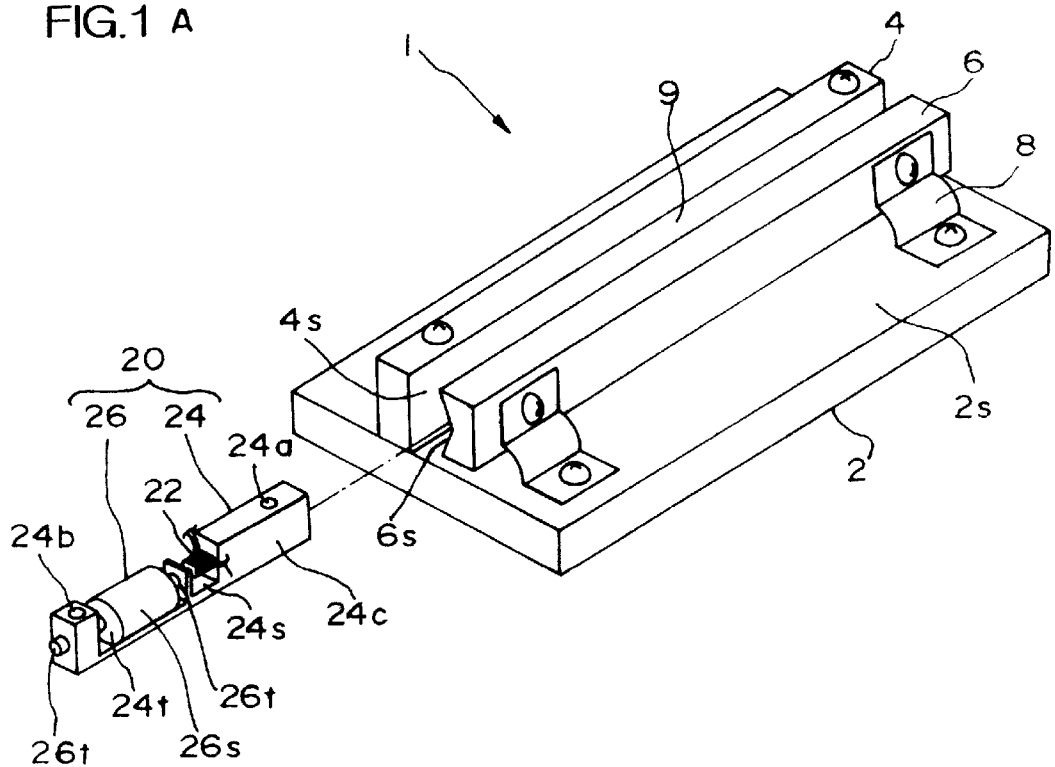
FIG. 1A is a perspective view of a drive device previously proposed by the present applicants.
FIG. 1B is a front view of the drive device of FIG. 1A.
Figure 1:
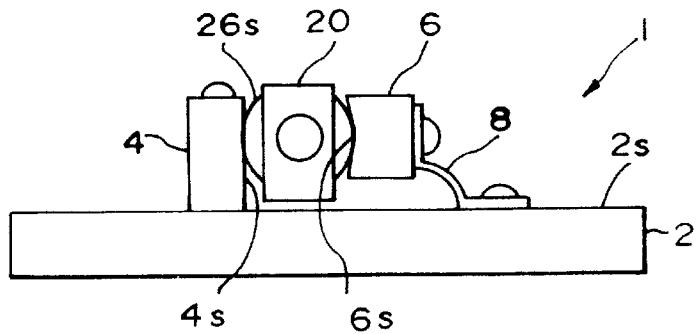

Briefly, drive device 10 supports a drive unit 20 via a pair of fixed friction members 14. Drive unit 20 includes a piezoelectric element 22, a moving body 24 and a friction drive member 26, and is constructed as shown in the example of the related art shown in FIG. 1, with main body 26s of friction drive member 26 held between the opposed fixed friction members 14. The pair of fixed friction members 14 are arranged in parallel at mutually equal spacing, and are fixedly attached to the top surface 12s of base 12.

Each fixed friction member 14 is provided with a first part 14a and third part 14c extending from bilateral ends of a second part 14b, so as to form a squared U-shaped cross section.

The first and second parts 14a and 14b are provided with notches 14s equally spaced and extending at right angles to third part 14c, to form a plurality of comb-teeth-like divided contact parts 15 via notches 14s. Each fixed friction member 14 is arranged such that the first and third parts 14a and 14c extend in mutually opposite directions, and the second part 14b enters somewhat into the movement path of friction drive member 26; the third parts 14c are fixedly attached to the top surface 12s of base 12.

The divided contact parts 15 of one fixed friction member 14 are bent in one direction and an opposite direction relative to divided contact part 15 of the other fixed friction member 14. When the second part 14b of each divided contact member 15 contacts the main body 26s of friction drive member 26, these second parts 14b bend and are retracted from within the movement path of friction drive member 26. The notches 14s are provided so as to have a uniform spring constant in the contact-release direction of divided contact member 15.

In this way a uniform friction force is exerted between the friction drive member and the fixed friction members regardless of the relative positions of the friction drive member and the fixed friction members.

Figure 3:
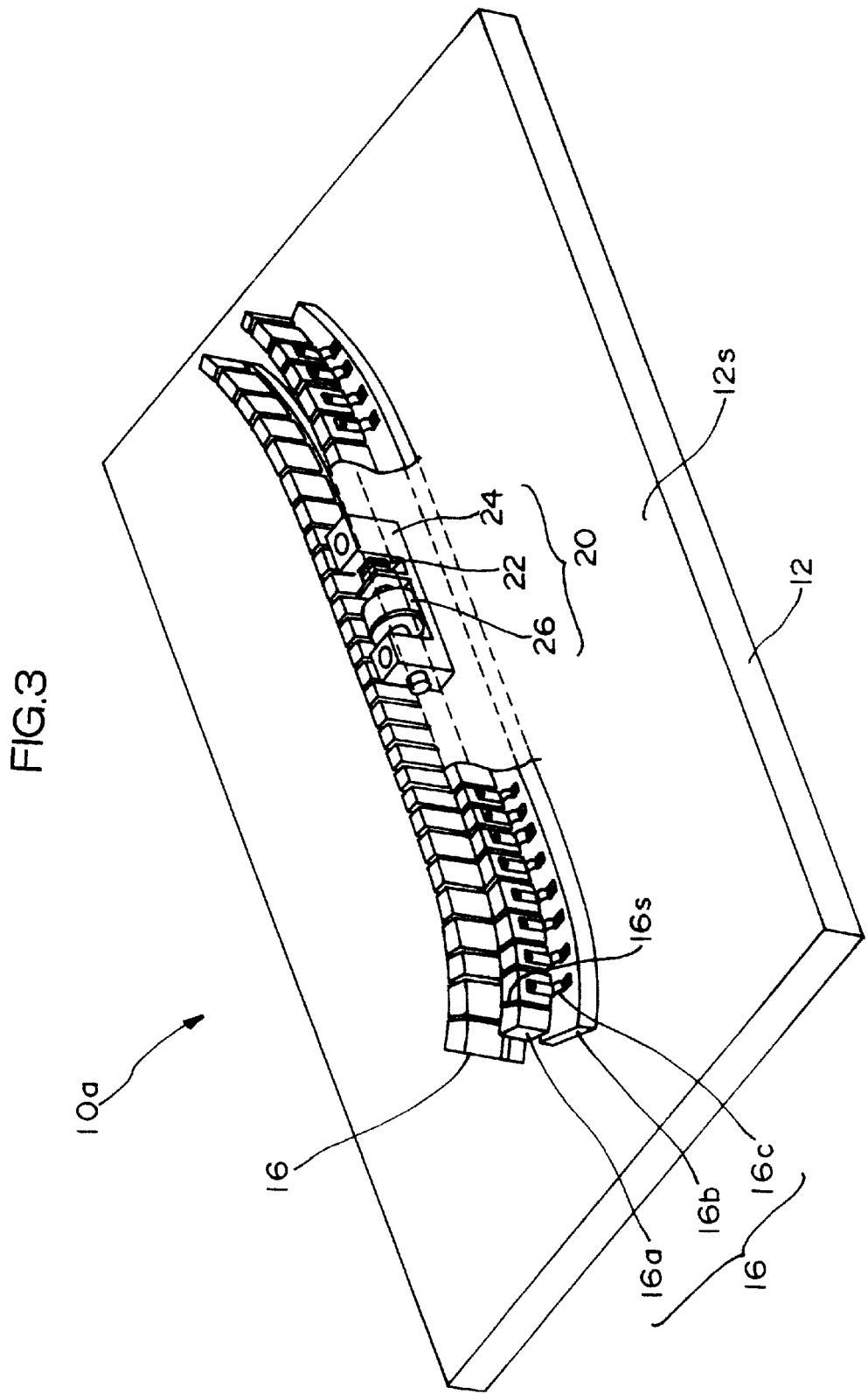
FIG. 3 is a perspective view of a drive device of a second embodiment of the present invention.

Driving device 10a of a second embodiment is described below with reference to the perspective view of FIG. 3.

Drive device 10a is provided with a drive unit 20 having a similar construction to the example of the related art disposed between a pair of fixed friction members 16 arranged at equal distance.

Fixed friction members 16 respectively comprises a plurality of divided contact parts 16a via support springs 16c so as to exert a force. That is, each fixed friction member 16 has a support 16b, and a plurality of divided parts 16a arranged along the support 16b which are bonded in a largely L-shaped cross section by support springs 16c. The support 16b is fixedly attached to the top surface 12s of base 12. The divided contact parts 16a are provided with a spacing 16s between adjacent divided contact parts 16a. Each divided contact part 16a is supported by support spring 16c so as to confront the divided contact parts 16a of the other fixed friction member 16 at a predetermined distance. The divided contact parts 16a enter slightly into the movement path of friction drive member 26. Support spring 16c has a suitable spring constant. That is, when the divided contact parts 16c come into contact with the main body 26s of friction drive member 26 of drive unit 20 so as to be retracted from within the movement path of friction drive unit 26, a uniform force is exerted on the friction drive member 26 by the support spring 16c supporting the divided contact parts 16c.

In this way a uniform friction force can be exerted between the friction drive member and fixed friction member regardless of the relative positions of the friction drive member and the fixed friction member.

Drive device 10b of a third embodiment is described below with reference to the perspective view of FIG. 4.

Drive device 10b is provided with a drive unit 20 having a similar construction to the example of the related art disposed between a pair of fixed friction members 18 arranged at equal distance.

Specifically, fixed friction member 18 comprises a plurality of plate spring members 18p arranged in two rows with a spacing 18s. Each spring member 18p has a horizontal part 18b and a vertical part 18a which extend substantially in an L-shaped cross section. Each spring member 18p has a vertical part 18a opposing the vertical part 18a of the other row of spring members 18p at a predetermined distance, with horizontal part 18b fixedly attached to the top surface 12s of base 12 so as to have horizontal part 18b extending to the opposite side horizontal part 18b of the other row. Each row of vertical parts 18a are arranged so as to enter slightly into the movement path of friction drive member 26, and are mutually curved in the contact-retraction direction. Spring member 18p has a suitable spring constant and when vertical part 18a comes into contact with the friction drive member 26, a uniform force is exerted on the friction drive member 26.

In this way a uniform friction force can be exerted between the friction drive member and fixed friction member regardless of the relative positions of the friction drive member and the fixed friction member.

Drive device 10c of a fourth embodiment is described below with reference to the perspective view of FIG. 5.

Drive device 10c is provided with a drive unit 20' having a similar construction to the example of the related art disposed within a tube-like fixed friction member 19 having a C-shaped cross section.

Drive unit 20' has a moving body 24' and a friction drive member 26' which are round in shape so as to be capable of moving without hindrance within the tube-like fixed friction member 19. Fixed friction member 19 is a metal tube provided with a slit 19s in the axial direction. The interior diameter of fixed friction member 19 is slightly smaller than the exterior diameter of drive unit 20', i.e., friction drive member 26'. In this way the spacing of slit 19s widens in the vicinity of the position of friction bonding between fixed friction member 19 and friction drive member 26', and fixed friction member 19 is tightened upon friction drive member 26' so as to exert a force on the exterior surface of friction drive member 26' of drive unit 20' from the interior surface of fixed friction member 19. Slit 19s is provided so as to exert a force of uniform magnitude regardless of the relative positions of the friction drive member 26' and fixed friction member 19 in the axial direction.

In this way a uniform friction force can be exerted between the friction drive member and fixed friction member regardless of the relative positions of the friction drive member and the fixed friction member.

Drive device 10d of a fifth embodiment is described below with reference to the perspective view of FIG. 6.

Figure 2:
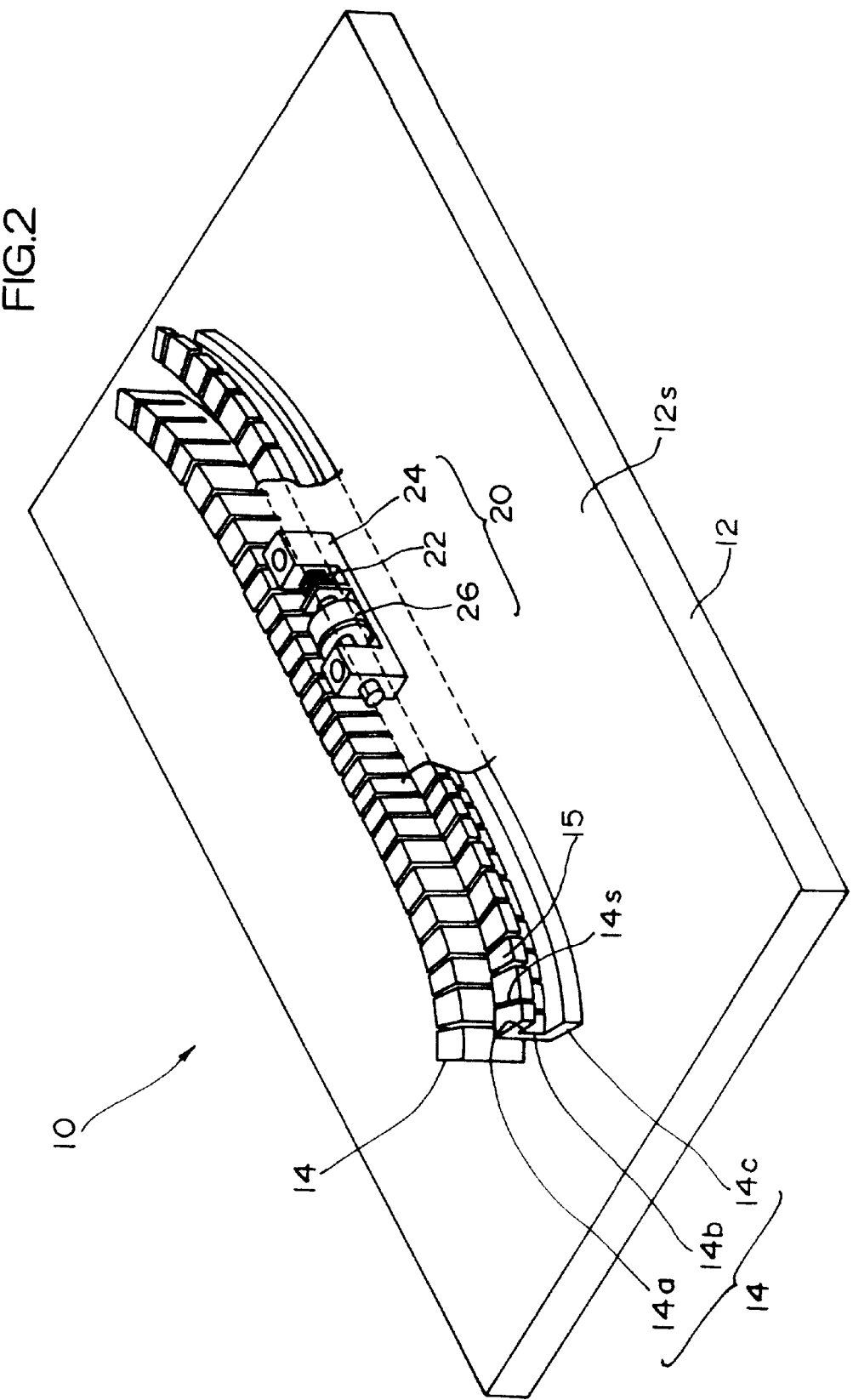
FIG. 2 is a perspective view of a drive device of a first embodiment of the present invention.

Drive device 10d is an improvement of the embodiment shown in FIG. 2. That is, notches 14s are formed between the second parts 14b of fixed friction member 14 of the divided contact parts 15 shown in FIG. 2, and friction drive member 26 is shaped so as to not become caught in the notch 14s. In the present embodiment, a sheet-like metal panel 80 is provided on the surface facing the second part 14b of each fixed friction member 14 (i.e., the surface which comes into contact with the friction drive member 26). The metal panel 80 is held between fixed friction member 14 and the friction drive member 26 so as to allow smooth sliding between the two members. The friction drive member 26 does not catch in the notch 14s due to the work of the metal panel 80, the friction drive member 26 can be formed in an optional shape, thereby improving design freedom. Furthermore, movement characteristics of the friction drive member 26 can be set by selecting a suitable material and surface shape of the metal panel 80.

Since each of the previously described drive devices 10, 10a, 10b, 10c, and 10d exerts a uniform friction force regardless of the relative positions of the friction drive members 26, 26' and the fixed friction members 14, 16, 18, and 19, a stable drive force is produced having a uniform drive speed and drive force. The drive device of the present invention is not limited to a linear drive, and is readily applicable to producing a drive along a curve. Although the fixed friction member forms a curved movement path in the aforesaid embodiments, it may also form a linear movement path as in the related art shown in FIGS. 1A and 1B.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A drive device comprising:

a drive unit having an electromechanical transducer which expands/contracts in response to reception of a drive pulse, said drive unit being movable in response to the expansion/contraction of the electromechanical transducer; and a fixed friction member which frictionally supports said drive unit so that said drive unit can move along said fixed friction member in response to the expansion/contraction of the electromechanical transducer;

wherein said fixed friction member is divided into a plurality of portions arranged in a row and each of said portions can independently exert friction force on said drive unit.

2. A drive device in accordance with claim 1, wherein said fixed friction member comprises a pair of members, said pair of members being arranged in a parallel orientation such that said pair of members has a uniform interval therebetween.

3. A drive device in accordance with claim 2, wherein the uniform interval between said pair of members is smaller than a maximum external dimension of said drive unit such that at least one of said pair of members elastically deforms as said drive unit moves along said fixed friction member.

4. A drive device in accordance with claim 1, wherein each portion of said plurality of portions of said fixed friction member is held by a respective spring.

5. A drive device in accordance with claim 1, wherein each portion of said plurality of portions of said fixed friction member is a plate spring.

6. A drive device in accordance with claim 1, wherein said fixed friction member is curved, such that said drive unit moves along a curved path corresponding to said curved fixed friction member.

7. A drive device in accordance with claim 1, wherein said drive unit further comprises:

a moving body fixedly attached to a first end of said electromechanical transducer; and a friction drive member fixedly attached to a second end of said electromechanical transducer, said second end being located opposite said first end, wherein the movement of said friction drive member is frictionally resisted by said fixed friction member.

8. A drive device comprising:

a drive unit having an electromechanical transducer which expands/contracts in response to reception of a drive pulse, said drive unit being movable in response to the expansion/contraction of the electromechanical transducer; and a fixed friction member which frictionally supports said drive unit so that said drive unit can move along said fixed friction member in response to the expansion/contraction of the electromechanical transducer;

wherein said fixed friction member includes a plurality of notches forming a plurality of comb-teeth-like divided contact portions, and each of said divided contact portions can independently exert friction force on said drive unit.

9. A drive device in accordance with claim 8, wherein said fixed friction member comprises a pair of members, said pair of members being arranged in a parallel orientation such that said pair of members has a uniform interval therebetween.

10. A drive device in accordance with claim 9, wherein the uniform interval between said pair of members is smaller than a maximum external dimension of said drive unit such that each of said pair of members elastically deforms as said drive unit moves along said fixed friction member.

11. A drive device in accordance with claim 8, wherein each portion of said plurality of divided contact portions of said fixed friction member functions as a spring.

12. A drive device in accordance with claim 8, wherein said fixed friction member is curved, such that said drive unit moves along a curved path corresponding to said fixed friction member.

13. A drive device in accordance with claim 8, wherein said drive unit further comprises:

a moving body fixedly attached to a first end of said electromechanical transducer; and a friction drive member fixedly attached to a second end of said electromechanical transducer, said second end being located opposite said first end, wherein the movement of said friction drive member is frictionally resisted by said fixed friction member.

14. A drive device comprising:

a drive unit having an electromechanical transducer which expands/contracts in response to reception of a drive pulse, said drive unit being movable in response to the expansion/contraction of the electromechanical transducer; and a friction member which defines a path, wherein said drive unit is movable along said path in response to the expansion/contraction of the electromechanical transducer;

wherein said friction member operatively enqages said drive unit, and said friction member is deformable to exert a friction force at an interface between said friction member and said drive unit and wherein said friction member has a lengthwise slit to allow said friction member to accommodate said drive unit.

15. A drive device comprising:

a drive unit having an electromechanical transducer which expands/contracts in response to reception of a drive pulse, said drive unit being movable in response to the expansion/contraction of the electromechanical transducer, said drive unit including a moving body fixedly attached to a first end of said electromechanical transducer and a friction drive element fixedly attached to a second end of said electromechanical transducer, said second end being located opposite said first end, wherein the movement of said friction drive element is frictionally resisted by said friction member; and a friction member which defines a path, wherein said drive unit is movable along said path in response to the expansion/contraction of the electromechanical transducer;

wherein said friction member operatively engages said drive unit, and said friction member is deformable to exert a friction force at an interface between said friction member and said drive unit.

16. A drive device in accordance with claim 1, further comprising a smoothing member attached to said plurality of portions of said fixed friction member such that said drive unit directly contacts said smoothing member as said drive unit moves along said fixed friction member.

17. A drive device for guiding movement of a drive unit, said drive device comprising:

a pair of fixed friction members for frictionally supporting a drive unit therebetween so that said drive unit is movable along a path formed by said fixed friction members, wherein each member of said pair of fixed friction members is divided into a plurality of portions positioned adjacently to one another and each portion of said plurality of portions can independently exert friction force on said drive unit.

18. A drive device in accordance with claim 17, wherein each portion of said plurality of portions has a spring attached thereto.

19. A drive device in accordance with claim 17, wherein each portion of said plurality of portions is a plate spring.

20. A drive device in accordance with claim 17, wherein the path includes at least one curved portion.

21. A drive device for guiding the movement of a drive unit, said drive device comprising:

a pair of fixed friction members which frictionally support said drive unit so that said drive unit is movable along a path formed by said fixed friction members;

wherein each member of said pair of fixed friction members includes a plurality of notches forming a plurality of comb-teeth-like divided contact portions, said plurality of divided contact portions are positioned adjacently to one another, and each of said divided contact portions can independently exert friction force on said drive unit.

22. A drive device in accordance with claim 21, wherein the path includes at least one curved portion.

* * * * *